US011906027B2

(12) United States Patent
Nakayama (10) Patent No.: US 11,906,027 B2
(45) Date of Patent: Feb. 20, 2024

(54) LIGHT-WEIGHT GEAR AND MANUFACTURING METHOD THEREOF, MANUFACTURING METHOD OF GEAR TRAIN, AND ROBOT

(71) Applicant: FANUC CORPORATION, Yamanashi (JP)

(72) Inventor: Kazutaka Nakayama, Yamanashi (JP)

(73) Assignee: FANUC CORPORATION, Yamanashi (JP)

(*) Notice: Subject to any disclaimer, the term of this patent is extended or adjusted under 35 U.S.C. 154(b) by 0 days.

(21) Appl. No.: 18/065,824

(22) Filed: Dec. 14, 2022

(65) Prior Publication Data

US 2023/0115356 A1 Apr. 13, 2023

Related U.S. Application Data

(63) Continuation of application No. 16/931,766, filed on Jul. 17, 2020, now Pat. No. 11,592,096.

(30) Foreign Application Priority Data

Aug. 30, 2019 (JP) ................. 2019-158476

(51) Int. Cl.
*F16H 55/08* (2006.01)
*B25J 9/10* (2006.01)
(Continued)

(52) U.S. Cl.
CPC .......... *F16H 55/0813* (2013.01); *B25J 9/102* (2013.01); *B29C 45/14491* (2013.01); *B29L 2015/003* (2013.01)

(58) Field of Classification Search
CPC ................. F16H 55/0813; B25J 9/102; B29C 45/14491; B29L 15/003
See application file for complete search history.

(56) References Cited

U.S. PATENT DOCUMENTS 9,707,992 B2 * 7/2017 Kiyota .................... F16H 55/22
10,724,620 B2 * 7/2020 Takeuchi ............. B62D 5/0454
(Continued)

FOREIGN PATENT DOCUMENTS

CN 102341608 A 2/2012
EP 2974852 * 2/2015 ............. B26C 70/48
(Continued)

OTHER PUBLICATIONS

Office Action dated Mar. 22, 2023, in corresponding Japanese Application No. 2019-158476, 8 pages.
(Continued)

*Primary Examiner* — Zakaria Elahmadi
(74) *Attorney, Agent, or Firm* — Maier & Maier, PLLC (57) ABSTRACT

A light-weight gear including: an annular tooth portion made of metal; a shaft extending along a central axis of the tooth portion and made of metal; and a coupling element configured to couple the shaft to the tooth portion and made of a resin, in which a joining part between the shaft and the coupling element and a joining part between the tooth portion and the coupling element are provided with irregularities configured to be engaged with one another in a circumferential direction, and corners of the irregularities are rounded to release a stress. Also, provided is a manufacturing method of a light-weight gear including: disposing the tooth portion and the shaft in a mold and injecting a molten resin into a cavity of the mold, thereby simultaneously performing injection molding of the coupling element and joining the coupling element to the tooth portion and the shaft.

11 Claims, 10 Drawing Sheets

(51) Int. Cl.
  *B29C 45/14*  (2006.01)
  *B29L 15/00*  (2006.01)

(56)  References Cited

U.S. PATENT DOCUMENTS

| | | | | |
|---|---|---|---|---|
| 2002/0178853 | A1* | 12/2002 | Konishi | F16H 55/06 |
| | | | | 74/457 |
| 2013/0228028 | A1* | 9/2013 | Kim | B29C 45/1671 |
| | | | | 264/279 |
| 2016/0016368 | A1* | 1/2016 | Kunishima | B29C 70/682 |
| | | | | 264/258 |
| 2018/0017149 | A1* | 1/2018 | Takeuchi | B62D 5/0454 |
| 2019/0040941 | A1* | 2/2019 | Kiyota | F16H 55/06 |
| 2019/0346035 | A1* | 11/2019 | Iijima | B29D 15/00 |
| 2021/0088112 | A1* | 3/2021 | Kiyota | B29C 45/27 |
| 2021/0148437 | A1* | 5/2021 | Kiyota | F16H 55/22 |

FOREIGN PATENT DOCUMENTS

| | | |
|---|---|---|
| JP | S6259356 U | 4/1987 |
| JP | H01104468 U | 7/1989 |
| JP | H01-148162 U | 10/1989 |
| JP | H04-267131 A | 9/1992 |
| JP | H05-018455 A | 1/1993 |
| JP | 2000-220699 A | 8/2000 |
| JP | 2004143526 A | 5/2004 |
| JP | 2009-041674 A | 2/2009 |
| JP | 2013-061008 A | 4/2013 |
| JP | 2013061004 A | 4/2013 |
| JP | 2013061004 * 9/2013 | ............ F16H 55/22 |
| JP | 2015-203477 A | 11/2015 |
| JP | 2016-125547 A | 7/2016 |
| JP | 2017203547 A | 11/2017 |
| JP | 6398280 B2 | 10/2018 |
| JP | 2019-070403 A | 5/2019 |
| WO | 2015159712 A1 | 10/2015 |

OTHER PUBLICATIONS

Search Report dated Mar. 15, 2023, in corresponding Japanese Application No. 2019-158476, 36 pages.

* cited by examiner

LIGHT-WEIGHT GEAR AND MANUFACTURING METHOD THEREOF, MANUFACTURING METHOD OF GEAR TRAIN, AND ROBOT

CROSS-REFERENCE TO RELATED APPLICATIONS

This application is a continuation of U.S. patent application Ser. No. 16/931,766 filed on Jul. 17, 2020 which claims the benefit of Japanese Patent Application No. 2019-158476, the content of which is incorporated herein by reference.

FIELD

The present disclosure relates to a light-weight gear and a manufacturing method thereof, a manufacturing method of a gear train, and a robot.

BACKGROUND

A light-weight gear configured such that a shaft made of metal and a tooth portion made of metal are coupled with a coupling element made of a resin in order to achieve weight reduction is known (see Japanese Unexamined Patent Application, Publication No. 2015-203477, for example).

SUMMARY

According to an aspect of the present disclosure, there is provided a light-weight gear including: an annular tooth portion made of metal; a shaft extending along a central axis of the tooth portion and made of metal; and a coupling element configured to couple the shaft to the tooth portion and made of a resin, in which a joining part between the shaft and the coupling element and a joining part between the tooth portion and the coupling element are provided with irregularities configured to be engaged with one another in a circumferential direction, and corners of the irregularities are rounded to release a stress.

DETAILED DESCRIPTION

A light-weight gear 1, a manufacturing method thereof, a manufacturing method of a gear train, and a robot according to a first embodiment of the present disclosure will be described below with reference to drawings.

The light-weight gear 1 according to the embodiment is used in the robot according to the embodiment, for example, an articulated type robot.

Figure 1:
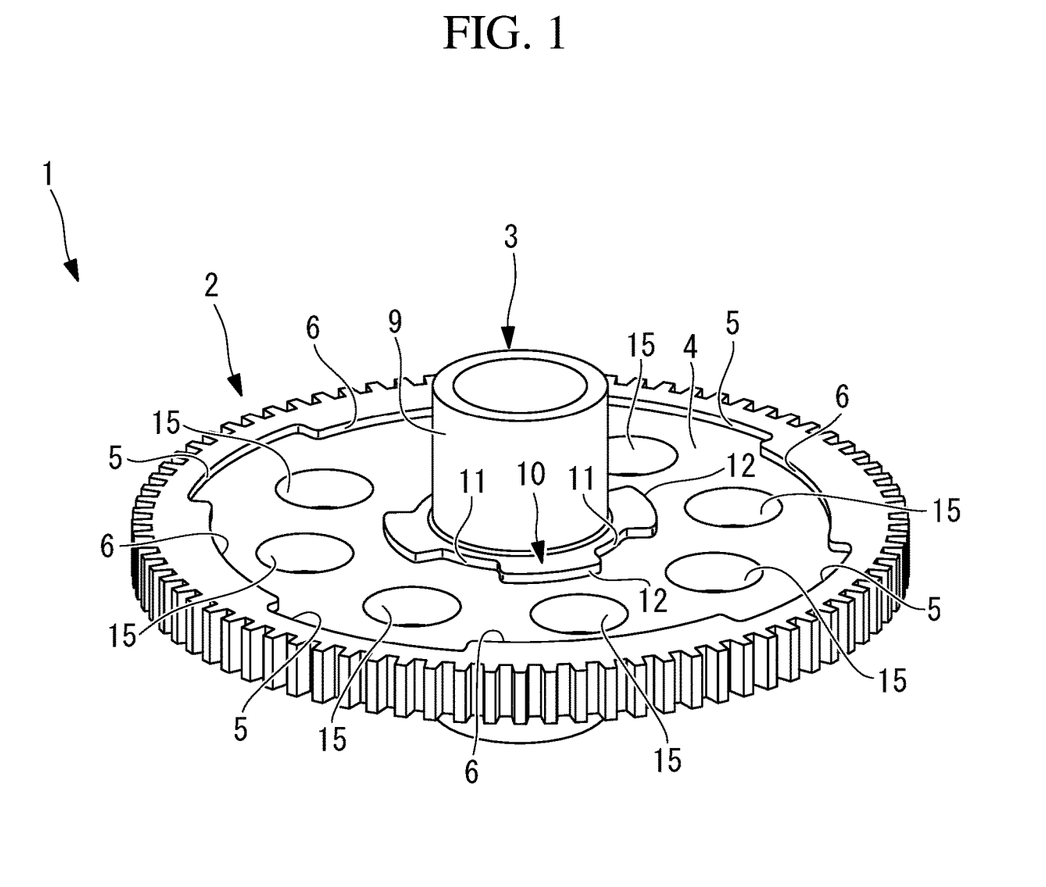
FIG. 1 is a perspective view illustrating a light-weight gear according to a first embodiment of the present disclosure.
Figure 2:
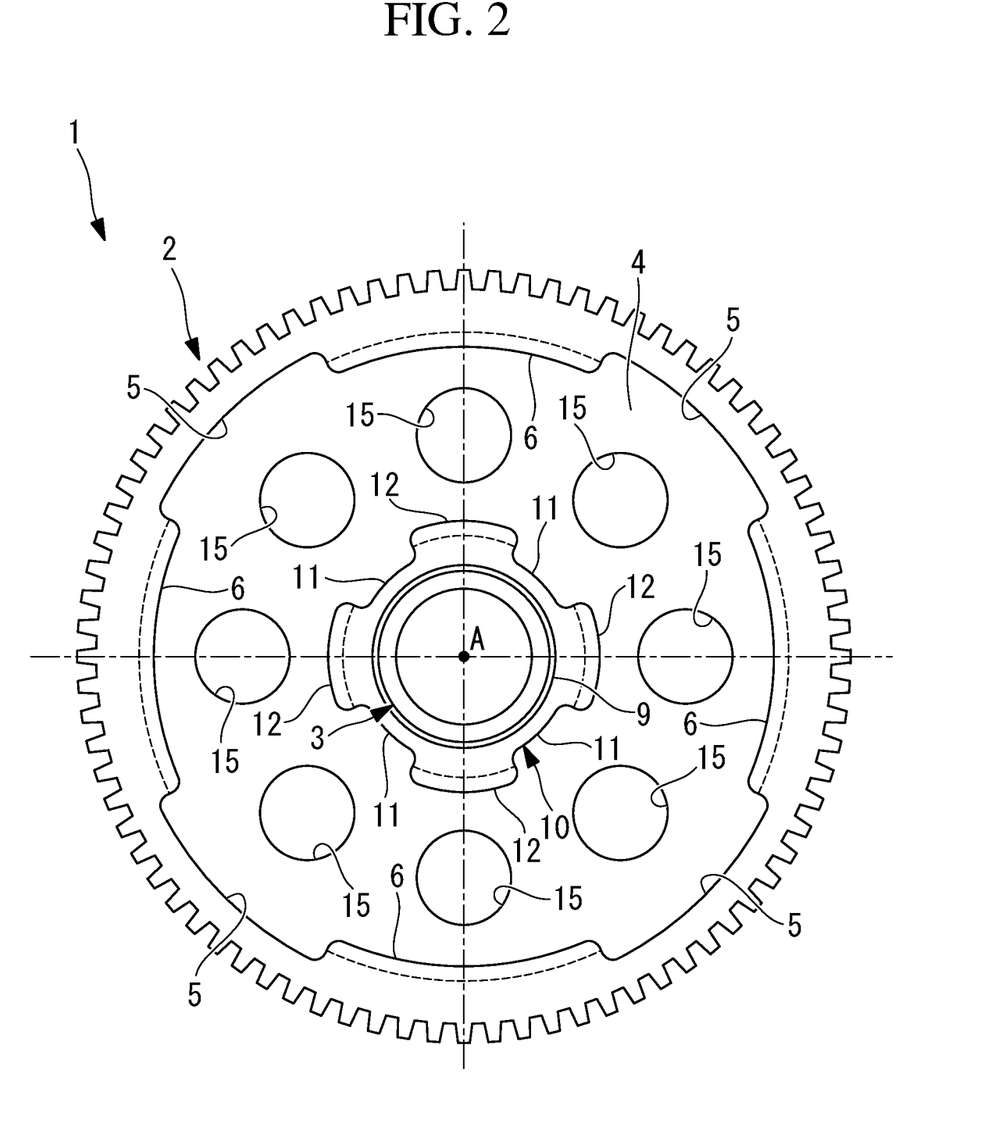
FIG. 2 is a front view illustrating the light-weight gear in FIG. 1.

The light-weight gear 1 according to the embodiment includes an annular tooth portion 2 made of a flat plate made of metal, a shaft 3 extending along a central axis A of the tooth portion 2 and made of metal, and a coupling element 4 configured to couple the tooth portion 2 to the shaft 3 and made of a resin as illustrated in FIGS. 1 and 2.

Figure 3:
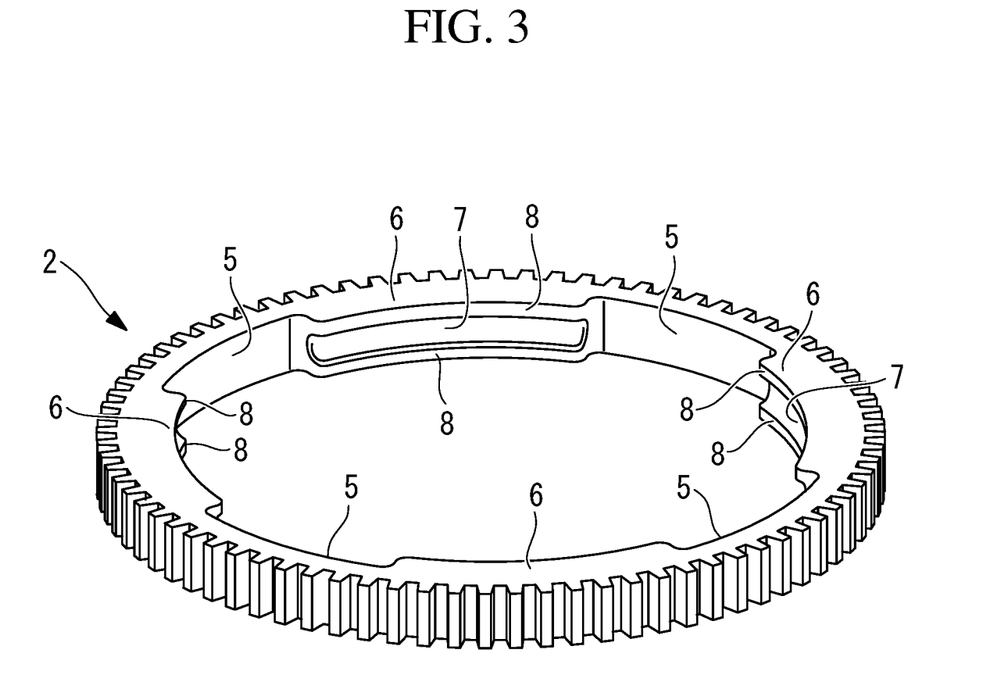
FIG. 3 is a perspective view illustrating a tooth portion of the light-weight gear in FIG. 1.
Figure 4:
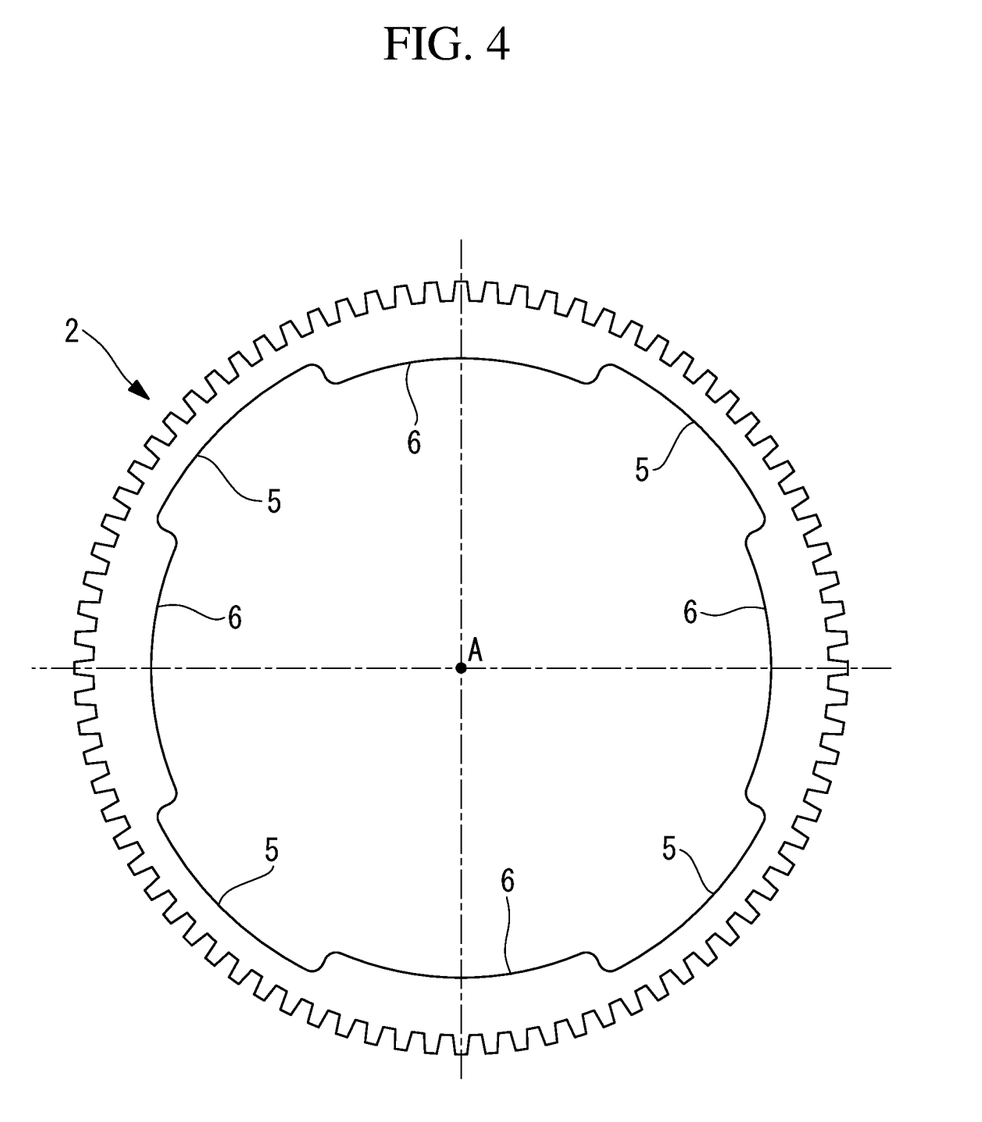
FIG. 4 is a front view illustrating the tooth portion in FIG. 3.
Figure 5:
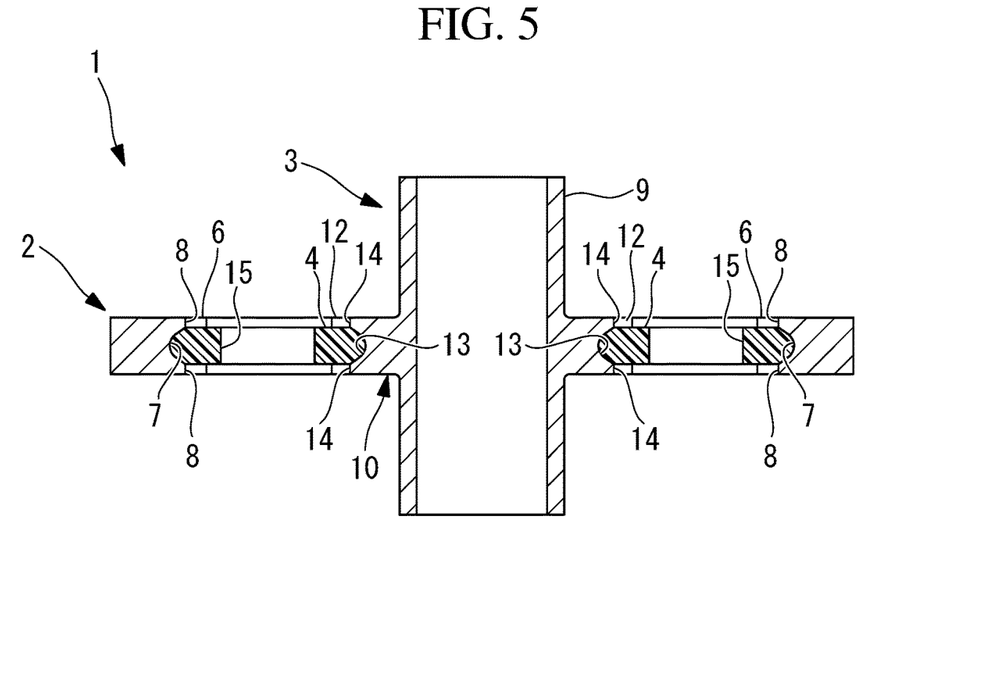
FIG. 5 is a vertical sectional view illustrating the light-weight gear in FIG. 1.

The tooth portion 2 has a plurality of teeth aligned in a circumferential direction in an outer peripheral surface and a plurality of first recessed portions (irregularities) 5 and first projecting portions (irregularities) 6 that are aligned in the circumferential direction in an inner peripheral surface and have irregularities in a radial direction as illustrated in FIGS. 3 and 4. Also, each of the first projecting portions 6 is provided with a second recessed portion (irregularity) 7 that is recessed outward in the radial direction at the center of the tooth portion 2 in the thickness direction as illustrated in FIG. 5. In this manner, the second projecting portions (irregularities) 8 extending inward in the radial direction relative to each second recessed portion 7 are formed on both sides of the second recessed portion 7 in a thickness direction. In addition, the second recessed portions 7 are not limited to those illustrated in the drawings, second recessed portions 7 with irregularities with opposite shapes may be employed, or second recessed portions 7 with irregularities configured in a plurality of stages may be employed.

Figure 6:
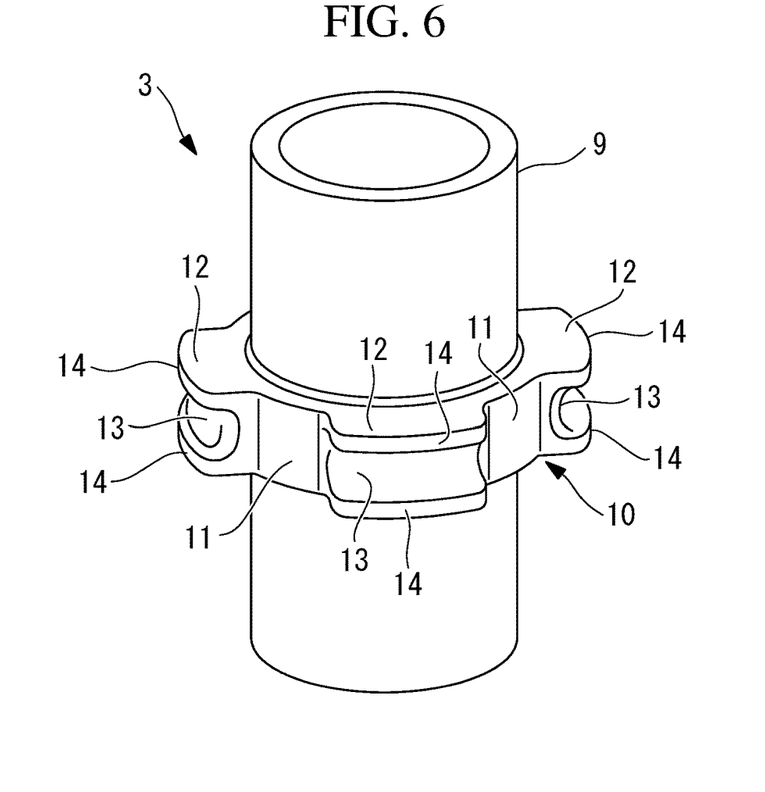
FIG. 6 is a perspective view illustrating a shaft of the light-weight gear in FIG. 1.
Figure 7:
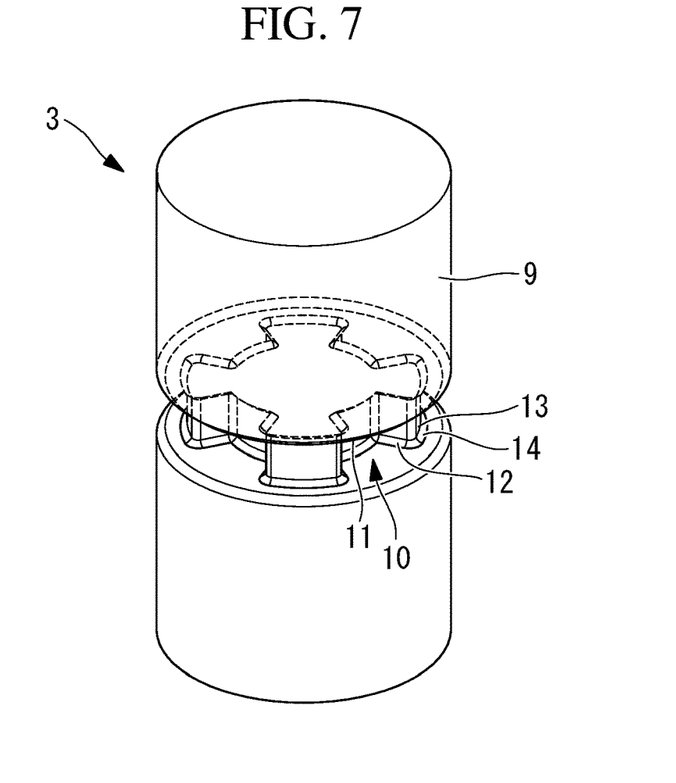
FIG. 7 is a perspective view illustrating a modified example of the shaft of the light-weight gear in FIG. 6.

The shaft 3 includes a columnar portion 9 supported by a bearing and a retaining ring, which are not illustrated, for example, and an engagement portion 10 that is disposed at a part of the columnar portion 9 in the axial direction and has a plurality of third recessed portions (irregularities) 11 and third projecting portions (irregularities) 12 that are aligned in the circumferential direction and have irregularities in the radial direction as illustrated in FIGS. 5 and 6. Also, each of the third projecting portions 12 is provided with a fourth recessed portion (irregularity) 13 recessed inward in the radial direction at the center of the third projecting portion 12 in the axial direction as illustrated in FIG. 5. In this manner, fourth projecting portions (irregularities) 14 extending outward in the radial direction relative to the fourth recessed portion 13 are formed on both sides of the fourth recessed portion 13 in the axial direction. Also, a shaft 3 obtained by machining a solid columnar member in an engraving direction to form the shaft 3 into an irregular shape as illustrated in FIG. 7 may be employed instead of using a cylindrical member.

Figure 8:
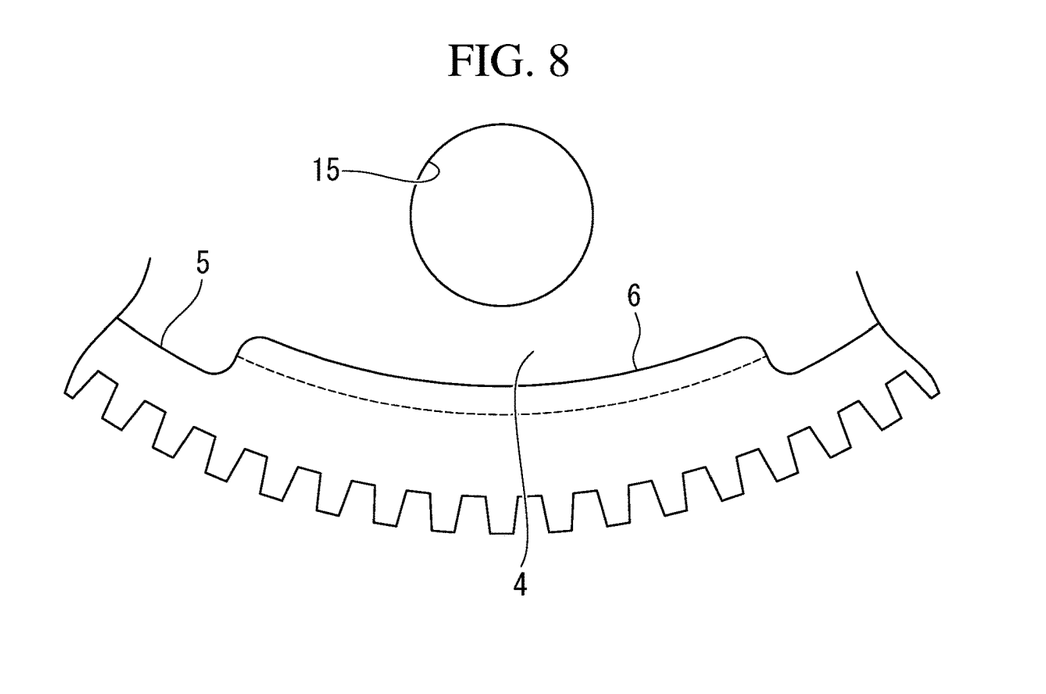
FIG. 8 is an enlarged view illustrating a part of the tooth portion in FIG. 3.
Figure 9:
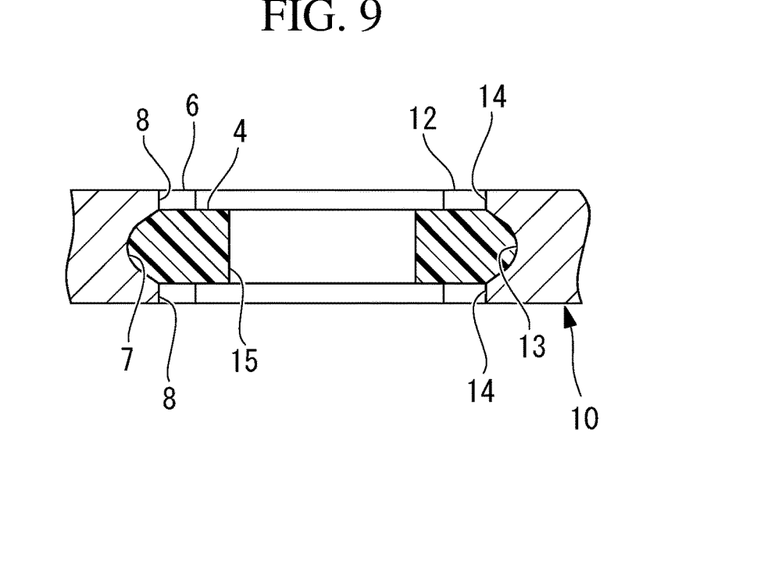
FIG. 9 is an enlarged vertical sectional view illustrating a joining part of a tooth portion, a coupling element, and a shaft in the light-weight gear in FIG. 5.

In the inner peripheral surface of the tooth portion 2, all corners of the irregularities configured of the first recessed portions 5, the first projecting portions 6, the second recessed portions 7, and the second projecting portions 8 are provided with rounds of equal to or greater than R2 (a curvature radius of 2 mm) as illustrated in FIG. 8. Also, in the outer peripheral surface of the engagement portion 10 of the shaft 3, all corners of the irregularities configured of the third recessed portions 11, the third projecting portions 12, the fourth recessed portions 13, and the fourth projecting portions 14 are also provided with rounds of equal to or greater than R2 as illustrated in FIG. 9. With a shape in which R of a corner of a machining end mill remains as it is as in a gear in the related art, it is not possible to avoid fatigue fracture due to stress concentration during a long-term operation even if a strong resin material is used. It is possible to further expect stress release as the R dimension increases.

Figure 10:
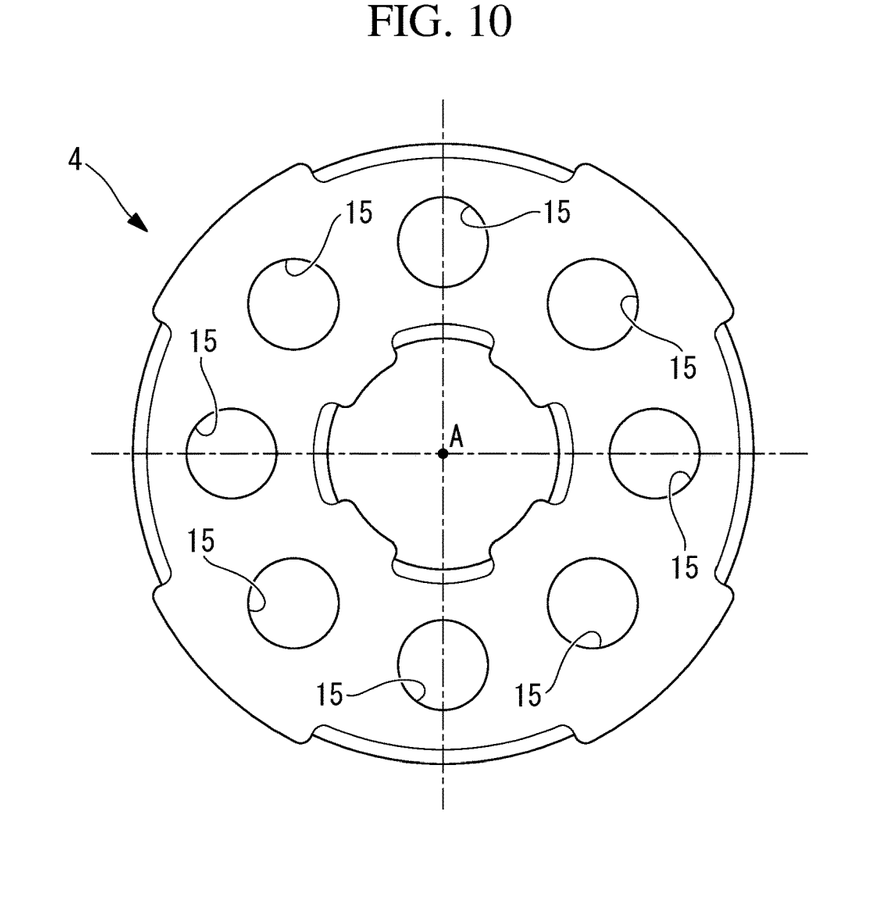
FIG. 10 is a front view illustrating a coupling element of the light-weight gear in FIG. 1.

The coupling element 4 is configured of an annular flat plate disposed between the shaft 3 and the tooth portion 2 as illustrated in FIG. 2. The coupling element 4 includes an outer peripheral surface with irregularities that are complementary to the shape of the inner peripheral surface of the tooth portion 2 and an inner peripheral surface with irregularities that are complementary to the shape of the engagement portion 10 of the shaft 3 as illustrated in FIG. 10. The thickness dimension of the coupling element 4 is set to be equal to or less than the dimension of the engagement portion 10 of the shaft 3 in the axial direction and the thickness dimension of the tooth portion 2 as illustrated in FIG. 5.

In other words, the coupling element 4 includes an outer peripheral surface with a shape that comes into close contact with the first recessed portions 5, the first projecting portions 6, the second recessed portions 7, and the second projecting portions 8 in the inner peripheral surfaces of the tooth portion 2 with no clearances. Also, the coupling element 4 includes an inner peripheral surface with a shape that comes into close contact with the third recessed portions 11, the third projecting portions 12, the fourth recessed portions 13, and the fourth projecting portions 14 of the engagement portion 10 of the shaft 3 with no clearances. In this manner, the corners of the irregularities in the outer peripheral surface and the inner peripheral surface of the coupling element 4 are also provided with rounds that are complementary to the rounds at the corners of the tooth portion 2 and the shaft 3. In the drawing, the reference sign 15 represents through-holes provided in the coupling element 4 and penetrating therethrough in a plate thickness direction.

The tooth portion 2 and the shaft 3 are configured of sintered metal. Also, the tooth portion 2 and the shaft 3 may be obtained by shaving metal. A heat treatment to enhance surface hardness is performed on the tooth portion 2 or the shaft 3.

Also, a matrix of the resin of the coupling element 4 is configured of a thermoplastic resin. In addition, the resin of the coupling element 4 may be configured of a fiber-reinforced thermoplastic resin.

A manufacturing method of the light-weight gear 1 according to the embodiment configured as described above will be described below. As the light-weight gear 1 according to the embodiment, the shaft 3 is first formed by sintering, and the tooth portion 2 is formed by sintering. The shaft 3 and the tooth portion 2 may be formed in the opposite order or at the same time. Also, a heat treatment to enhance surface hardness may be performed on the formed shaft 3 and the tooth portion 2.

Then, the formed shaft 3 and the tooth portion 2 are accommodated as insert metal in a cavity formed in a mold, and the mold is closed. A tightly closed cavity including the inner peripheral surface of the tooth portion 2 and the outer peripheral surface of the engagement portion 10 of the shaft 3 as a part of an inner wall is formed in this manner, and then a molten resin is injected into the cavity.

As a result, the coupling element 4 made of the annular flat plate is molded between the shaft 3 and the tooth portion 2, and it is possible to manufacture the integrated light-weight gear 1 in which the coupling element 4 is fixed to the shaft 3 and the tooth portion 2 by filling the clearance with the engagement portion 10 of the shaft 3 and the clearance with the inner peripheral surface of the tooth portion 2.

According to the light-weight gear 1 in the embodiment, it is possible to reduce the weight of the light-weight gear 1 as compared with a case in which all of the shaft 3, the tooth portion 2, and the coupling element 4 are made of metal, by making only the shaft 3 and the tooth portion 2 of metal and configuring the coupling element 4 of a resin.

If a torque around the central axis A is received by the tooth portion 2 meshing with another gear, the torque is transmitted to the shaft 3 via the joining part between the tooth portion 2 and the coupling element 4 and the joining part between the coupling element 4 and the shaft 3. The same applies to a case in which the torque is transmitted from the shaft 3 to the tooth portion 2.

The inner peripheral surface of the tooth portion 2 is provided with the plurality of first recessed portions 5 and first projecting portions 6 aligned in the circumferential direction, and irregularities with a shape that comes into close contact with the first recessed portions 5 and the first projecting portions 6 are formed in the coupling element 4. Therefore, the torque applied to the tooth portion 2 is transmitted from the tooth portion 2 to the coupling element 4 in a plane extending so as to intersect the circumferential direction at all parts between the first recessed portions 5 and the first projecting portions 6.

On the other hand, the engagement portion 10 of the shaft 3 is also provided with the plurality of third recessed portions 11 and third projecting portions 12 aligned in the circumferential direction, and irregularities with the shape that comes into close contact with the third recessed portions 11 and the third projecting portions 12 are formed in the coupling element 4. Therefore, the torque transmitted to the coupling element 4 is transmitted from the coupling element 4 to the shaft 3 in a plane extending so as to intersect the circumferential direction at all parts between the third recessed portions 11 and the third projecting portions 12.

In this case, according to the light-weight gear 1 in the embodiment, rounds of equal to or greater than R2 are formed at all the corners of the irregularities configured of the first recessed portions 5 and the first projecting portions 6 and all the corners of the irregularities configured of the third recessed portions 11 and the third projecting portions 12. Therefore, there is an advantage that it is possible to prevent excessive stress concentration from being caused at the corners of the irregularities of the coupling element 4 by both the torque transmitted from the tooth portion 2 to the coupling element 4 and the torque transmitted from the coupling element 4 to the shaft 3.

Also, if a force in the axial direction is received from another gear with which the tooth portion 2 meshes, then the force is transmitted to the shaft 3 via the joining part between the tooth portion 2 and the coupling element 4 and the joining part between the coupling element 4 and the shaft 3. The same applies to a case in which the torque is transmitted from the shaft 3 to the tooth portion 2.

The inner peripheral surface of the tooth portion 2 is provided with the second recessed portions 7 and the second projecting portions 8 aligned in the axial direction, and irregularities with a shape that comes into close contact with the second recessed portions 7 and the second projecting portions 8 are formed in the coupling element 4. Therefore, the force applied to the tooth portion 2 is transmitted from the tooth portion 2 to the coupling element 4 in a plane extending so as to intersect the circumferential direction between the second recessed portions 7 and the second projecting portions 8.

On the other hand, the engagement portion 10 of the shaft 3 is also provided with the plurality of fourth recessed portions 13 and fourth projecting portions 14 aligned in the axial direction, and irregularities with the shape that comes into close contact with the fourth recessed portions 13 and the fourth projecting portions 14 are formed in the coupling element 4. Therefore, the force transmitted to the coupling element 4 is transmitted from the coupling element 4 to the shaft 3 in a plane extending so as to intersect the circumferential direction between the fourth recessed portions 13 and the fourth projecting portions 14.

Even in this case, rounds of equal to or greater than R2 are formed at all the corners of the irregularities configured of the second recessed portions 7 and the second projecting portions 8 and all the corners of the irregularities configured of the fourth recessed portions 13 and the fourth projecting portions 14 according to the light-weight gear 1 in the embodiment. Therefore, there is an advantage that it is also possible to prevent excessive stress concentration from being caused at the corners of the irregularities of the coupling element 4 by both the force in the axial direction transmitted from the tooth portion 2 to the coupling element 4 and the force in the axial direction transmitted from the coupling element 4 to the shaft 3.

Also, according to the light-weight gear 1 in the embodiment, the stress concentration at all the corners is reduced, and therefore, there is also an advantage that it is possible to configure the thickness dimension of the coupling element 4 to be relatively thin and to effectively reduce the weight.

Also, according to the light-weight gear 1 in the embodiment, the coupling element 4 is configured to have a thickness dimension of equal to or less than that of the tooth portion 2, and it is thus possible to sufficiently reduce the weight as compared with a case in which the coupling element 4 is configured of a metal. The gear in the related art is adapted such that the thickness of the coupling element 4 made of a resin is thick so as to wrap the metal tooth portion 2 and does not have such a benefit of weight reduction as compared with a metal coupling portion with a thin thickness, which is often seen in an integrated gear made of metal.

In addition, since the coupling element 4 is configured of a thermoplastic resin, it is possible to easily mold the coupling element 4 through injection molding.

Further, since the plurality of through-holes 15 are provided in the coupling element 4, it is possible to sufficiently reduce the weight.

Also, providing the through-holes 15 enables execution of an operation of fastening bolts at portions covered with the coupling element 4 and the like in a state in which the light-weight gear 1 is kept attached.

In addition, since the shaft 3 and the tooth portion 2 are configured of sintered metal, it is possible to reduce the parts to be machined and thereby to reduce costs. Also, it is possible to improve a strength of joining of the coupling element 4 to the shaft 3 and the tooth portion 2 due to an anchor effect in which the resin of the coupling element 4 enters fine pores of the sintered metal.

Surface hardness is improved by performing a heat treatment on the tooth portion 2 and the shaft 3. In this manner, the coupling element 4 can also secure a surface pressure strength that is equivalent to that of the tooth portion 2 made of metal.

Note that although the coupling element 4 is provided with the through-holes 15 penetrating therethrough in the plate thickness direction in order to reduce the weight in the embodiment, recessed portions that are recessed in the axial direction may be provided instead. This can also lead to weight reduction.

In addition, it is preferable to employ a resin with high heat conductivity as the resin configuring the coupling element. In this manner, it is possible to facilitate transmission of a heat generated when the gears mesh with one another from the tooth portion 2 to the side of the shaft 3, and as a result, it is possible to improve durability of the coupling element 4.

Also, it is preferable to employ a resin with excellent oil resistance as the resin configuring the coupling element 4. In this manner, it is possible to prevent the coupling element 4 from swelling or being degraded due to influences of a lubricant.

In addition, although the one-stage light-weight gear 1 has been employed in the embodiment, the embodiment may be applied to a two-stage gear that has two gears aligned in the axial direction instead. In particular, it is possible to significantly reduce the weight by employing the light-weight gear 1 as a large gear. Also, it is possible to configure a light-weight deceleration mechanism as a combination of two-stage gears.

In addition, although a spur gear has been exemplified as a type of the light-weight gear 1 in the embodiment, the type of the light-weight gear 1 is not limited thereto, and a helical gear, a bevel gear, a worm gear, a hypoid gear, or the like, a load of which acts in the axial direction as well, may be employed. In pinions of the worm gear and the hypoid gear, it is also possible to reduce the weights by making only the entire tooth portion 2 of metal and coupling a resin shaft 3 to the tooth portion 2. In this case, the coupling portion between the tooth portion 2 and the shaft 3 preferably has irregularities relative to a rotation direction of the shaft 3 to transmit a torque, and R to release a stress is preferably provided at corners thereof. Also, since there is a probability that a minute thrust force is generated due to inclination of gears caused by a force acting on teeth even in a case of a spur gear, it is preferable to provide irregularities and rounds to release a stress in the axial direction as well.

In addition, it is possible to reduce the weight of a robot by using a lot of light-weight gears 1 according to the embodiment as gears used in the robot.

Figure 11:
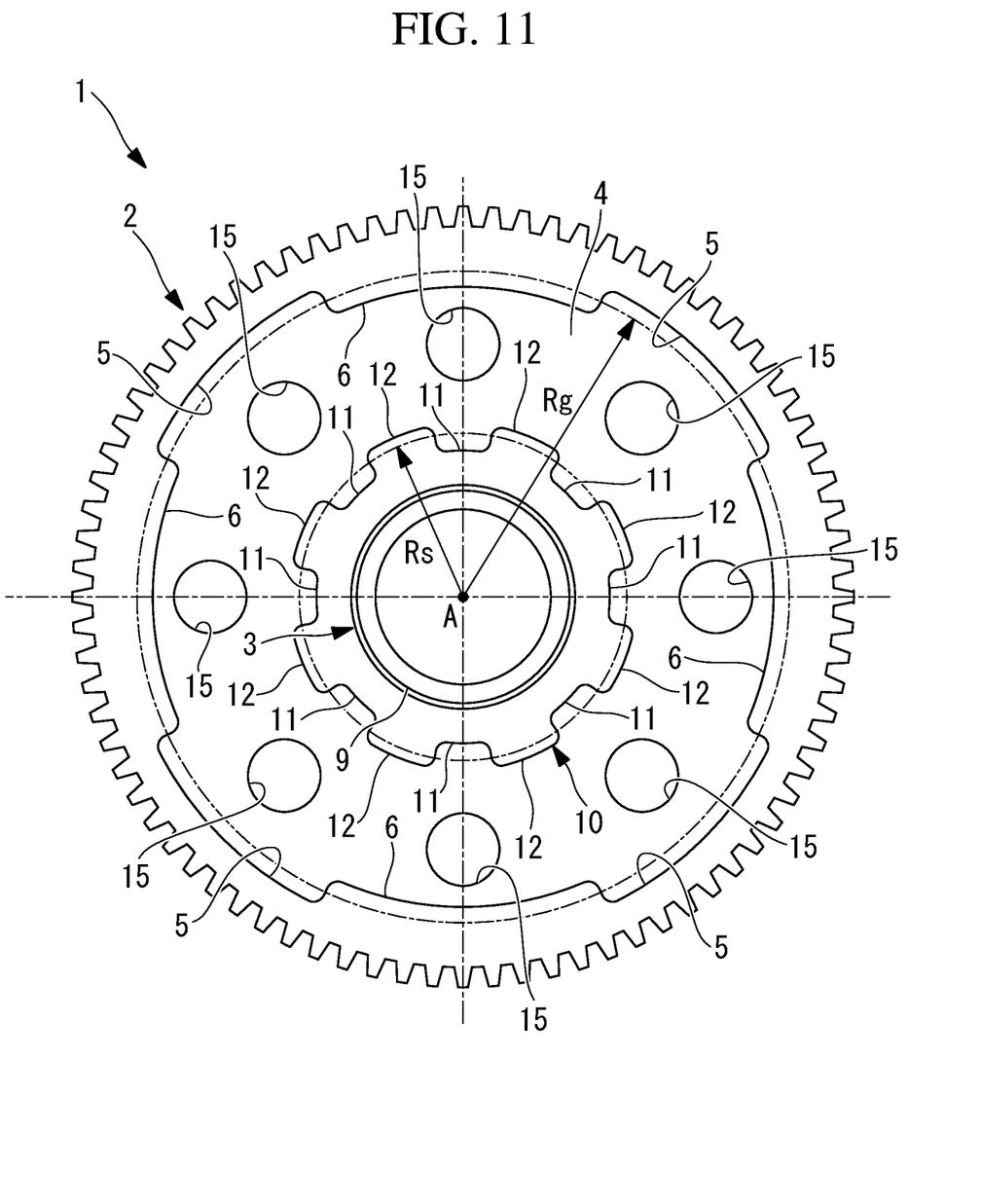
FIG. 11 is a front view illustrating a modified example of the light-weight gear in FIG. 1.

In addition, the number of irregularities engaged in the circumferential direction at the joining part between the shaft 3 and the coupling element 4 may be set to be greater than the number of irregularities engaged in the circumferential direction at the joining part between the tooth portion 2 and the coupling element 4 in the embodiment. As illustrated in FIG. 11, for example, the number of the irregularities configured of the first recessed portions 5 and the first projecting portions 6 is four, which is smaller than the number of irregularities configured of the third recessed portions 11 and the third projecting portions 12, namely eight.

In a case in which a torque is transmitted from the tooth portion 2 to the shaft 3 via the coupling element 4, or in an opposite case, the torque transmitted at the joining part between the shaft 3 and the coupling element 4 is the same as the torque transmitted at the joining part between the tooth portion 2 and the coupling element 4. Since a distance Rs from the central axis A to the joining part between the shaft 3 and the coupling element 4 is smaller than a distance Rg from the central axis A to the joining part between the tooth portion 2 and the coupling element 4, a force in a tangential direction acting on each irregularity becomes small in a case in which the numbers of irregularities are the same.

Thus, the number of irregularities configured of the first recessed portions 5 and the first projecting portions 6 is set to be smaller than the number of irregularities configured of the third recessed portions 11 and the third projecting portions 12. In this manner, it is possible to reduce a difference in surface pressures of a surface of each irregularity that receives the force in the tangential direction even if the shapes of the irregularities are set to be equivalent to each other.

Specifically, it is possible to equalize surface pressures by meeting the following conditional expression in a case in which the sizes of the surfaces of the irregularities that receive the force in the tangential direction, namely, the surfaces extending in the direction that intersects the circumferential direction are the same.

$$Pg = Ps \times Rs/Rg$$

Here,

Pg: the number of irregularities configured of the first recessed portions 5 and the first projecting portions 6

Ps: the number of irregularities configured of the third recessed portions 11 and the third projecting portions 12

Rs: the distance from the central axis A to the joining part between the shaft 3 and the coupling element 4

Rg: the distance from the central axis A to the joining part between the tooth portion 2 and the coupling element 4.

The surface pressures are not necessarily equal to each other in a strict sense.

Figure 12:
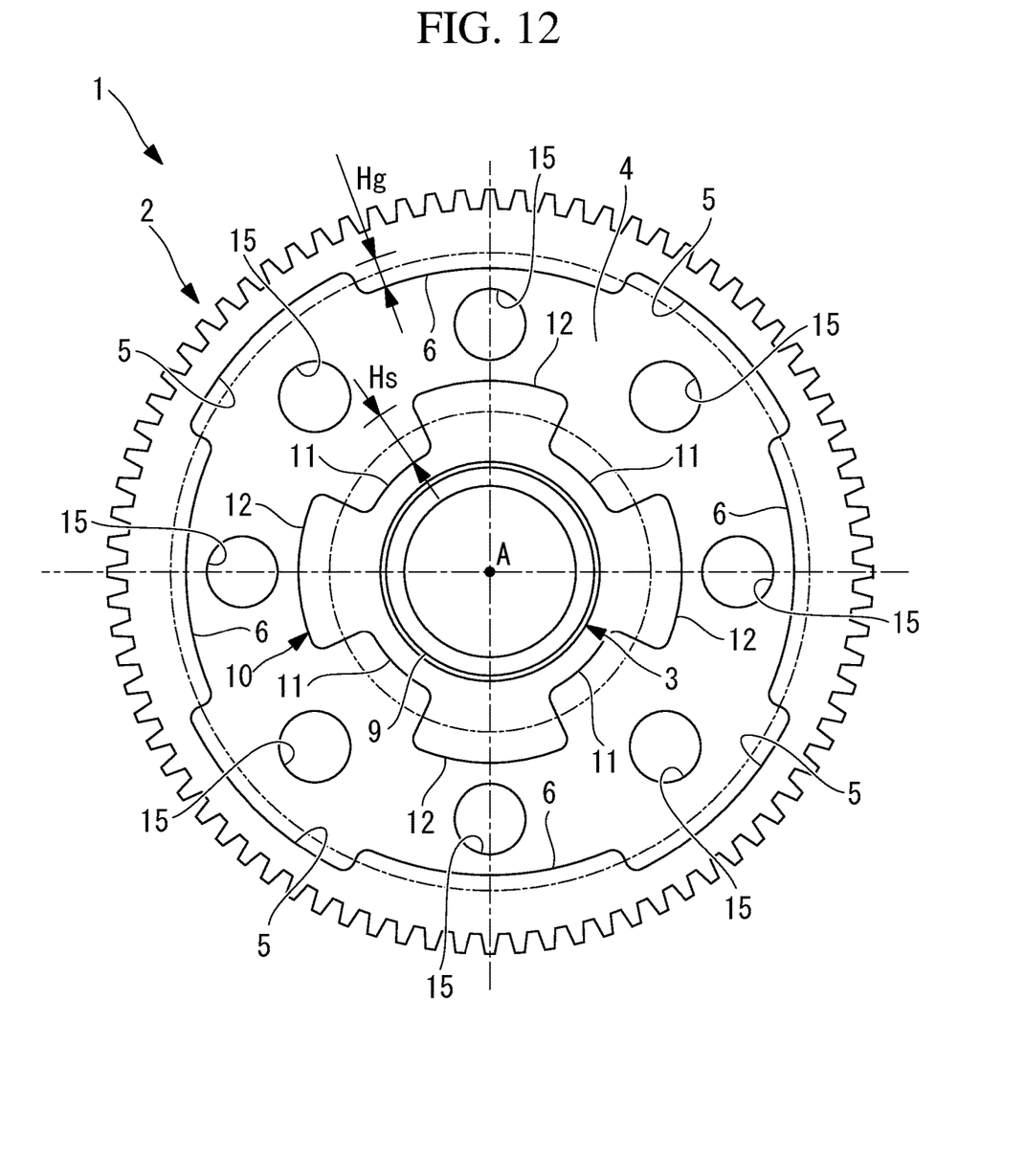
FIG. 12 is a front view illustrating another modified example of the light-weight gear in FIG. 1.

Also, the sizes of the surfaces of the irregularities that receive the force in the tangential direction, namely the surfaces extending in the direction that intersects the circumferential direction may be set to be different from each other instead of or in addition to setting different numbers of irregularities. As illustrated in FIG. 12, for example, a height Hg of the irregularities configured of the first recessed portions 5 and the first projecting portions 6 may be set to be smaller than a height Hs of the irregularities configured of the third recessed portions 11 and the third projecting portions 12. Alternatively, the length of the irregularities configured of the first recessed portions 5 and the first projecting portions 6 in the axial direction may be set to be shorter than the length of the irregularities configured of the third recessed portions 11 and the third projecting portions 12 in the axial direction. Also, the patterns and the number of stages of the irregularities are not limited to those illustrated in the drawing, and any pattern and any number of stages of the irregularities may be employed as long as similar functions are obtained.

Next, a manufacturing method of a gear train according to an embodiment of the present disclosure will be described below with reference to drawings.

The manufacturing method of a gear train according to the embodiment is a method for manufacturing a gear train by causing the aforementioned light-weight gear 1 to mesh with another gear 20.

Figure 13:
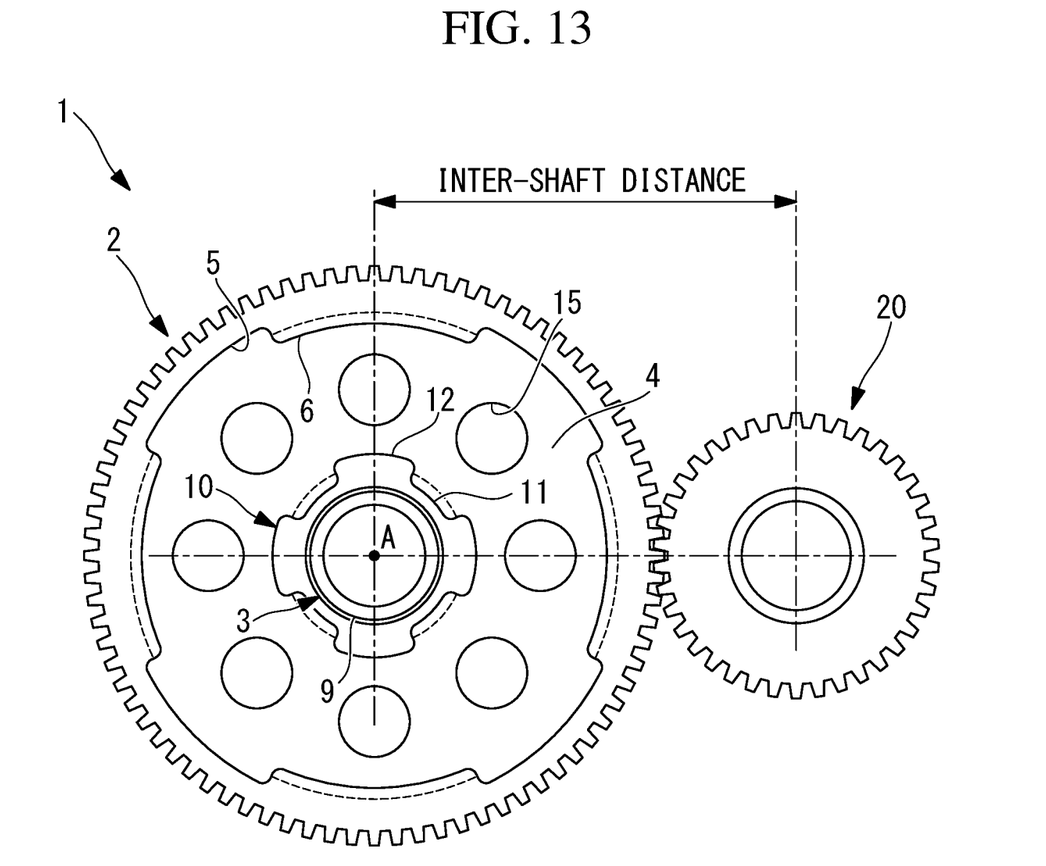
FIG. 13 is a front view illustrating an example of a gear train provided with the light-weight gear in FIG. 1

In the manufacturing method, amounts of backlash at meshing parts of all teeth between the light-weight gear 1 and the other gear 20, which are to be caused to mesh with each other, are inspected, and the light-weight gear 1 and the other gear 20 are set at a first inter-shaft distance at which the minimum value of the backlash is zero first as illustrated in FIG. 13. At this time, in order to prevent the shafts from being located excessively close to each other during meshing, a support portion of the other gear 20 is preferably temporarily fixed with a support portion fixing bolt axial force to such an extent that the support portion slides and escapes when the shafts are located excessively close to each other. Next, the inter-shaft distance between the light-weight gear 1 and the other gear 20 is set to a second inter-shaft distance reduced from the first inter-shaft distance by a predetermined amount. In this manner, the coupling element 4 made of a resin is elastically deformed, and it is thus possible to manufacture a gear train assembled in a state in which tooth surfaces of the light-weight gear 1 and the other gear 20 are in close contact with each other. In this manner, it is possible to minimize the amount of increase in backlash caused by extension of the inter-shaft distance that accompanies initial abrasion of the tooth surfaces of the gears 1 and 20 and thermal expansion of an arm. Also, the other gear 20 may be a light-weight gear.

In this manner, according to the manufacturing method of a gear train in the embodiment, it is possible to simply configure the gear train in which tooth surfaces of the light-weight gear 1 and the other gear 20 are constantly maintained in a closely contact state. In this manner, since the thus manufactured gear train does not have backlash, there is an advantage that it is possible to cause an operation of a gear on a driven side to precisely follow an operation of a gear on a driving side.

In addition, although the light-weight gear 1 and the other gear 20 have been exemplified as the gear train, the gear train is not limited thereto, and two light-weight gears 1 may be employed as the gear train, or three or more gears including at least one light-weight gear 1 may be employed as the gear train.

Although the robot using the light-weight gear 1 or a light-weight gear 1 manufactured by the manufacturing method thereof has been exemplified as the robot according to the embodiment, a robot using a gear train manufactured by the manufacturing method of a gear train according to the embodiment may be employed.

In addition, the configuration in which the rounds of equal to or greater than R2 are provided at all the corners of the irregularities configured of the first recessed portions 5, the first projecting portions 6, the second recessed portions 7, and the second projecting portions 8 and all the corners of the irregularities configured of the third recessed portions 11, the third projecting portions 12, the fourth recessed portions 13, and the fourth projecting portions 14 has been exemplified in the embodiment. The rounds to release a stress are not limited thereto as long as R is greater than R of a corner provided in a machining tool.

Although the present invention has been described using the typical embodiments, those skilled in the art will be able to understand that aforementioned modifications and various other modifications, omissions, or additions can be carried out without departing from the scope of the present invention.

The invention claimed is:

1. A light-weight gear, comprising:
an annular tooth portion made of metal;
a shaft made of metal extending along a central axis of the annular tooth portion; and
a coupling element configured to couple the shaft to the annular tooth portion, the coupling element made of a resin, wherein each of a first joining part between the shaft and the coupling element and a second joining part between the annular tooth portion and the coupling element is provided with a plurality of projecting and recessed portions configured to be engaged with one another in a circumferential direction, wherein a corner of each of the plurality of projecting and recessed portions has a roundness, wherein torque generated by using the light-weight gear and transmitted to the first joining part and the second joining part is distributed by the plurality of projecting and recessed portions, and stress concentration at the corner is released by the roundness, so that a degree of fatigue in the coupling element is reduced; and wherein at least one through-hole is provided only in the coupling element, the at least one through-hole configured to enable fastening of a fastening bolt through the through-hole.

2. The light-weight gear according to claim 1, wherein the plurality of projecting and recessed portions is further configured to be engaged with one another in an axial direction.

3. The light-weight gear according to claim 1, wherein the roundness has a radius that is greater than a corresponding radius of a corner provided at a machining tool.

4. The light-weight gear according to claim 1, wherein a surface pressure received by the plurality of projecting and recessed portions at each of the first joining part and the second joining part is equivalent to each other.

5. The light-weight gear according to claim 4, wherein one or more of the plurality of projecting and recessed portions engaged at the first joining part in the circumferential direction is greater than a number of the plurality of projecting and recessed portions engaged at the second joining part in the circumferential direction.

6. The light-weight gear according to claim 4, wherein a height in a radial direction of the plurality of projecting and recessed portions engaged at the first joining part in the circumferential direction is higher than a height in the radial direction of the plurality of projecting and recessed portions engaged at the second joining part in the circumferential direction.

7. The light-weight gear according to claim 1, wherein a matrix of the resin of the coupling element is configured of a thermoplastic resin.

8. The light-weight gear according to claim 1, wherein the resin of the coupling element is configured of a fiber-reinforced thermoplastic resin.

9. The light-weight gear according to claim 1, wherein at least either the shaft or the annular tooth portion is configured of sintered metal.

10. The light-weight gear according to claim 1, wherein a heat treatment to enhance surface hardness is performed on at least either the shaft or the annular tooth portion.

11. A manufacturing method of a light-weight gear, the light weight gear comprising:

an annular tooth portion made of metal;

a shaft made of metal and extending along a central axis of the annular tooth portion; and a coupling element configured to couple the shaft to the annular tooth portion, the coupling element made of a resin, wherein each of a first joining part between the shaft and the coupling element and a second joining part between the annular tooth portion and the coupling element is provided with a plurality of projecting and recessed portions configured to be engaged with one another in a circumferential direction, wherein a corner of each of the plurality of projecting and recessed portions has a roundness, wherein torque generated by using the light-weight gear and transmitted to the first joining part and the second joining part is distributed by the plurality of projecting and recessed portions, and stress concentration at the corner is released by the roundness, so that a degree of fatigue in the coupling element is reduced; and wherein at least one through-hole is provided only in the coupling element, the at least one through-hole configured to enable fastening of a fastening bolt through the through-hole, the method comprising steps of:

disposing the annular tooth portion and the shaft in a mold; and injecting a molten resin into a cavity of the mold, thereby simultaneously performing injection molding of the coupling element and joining of the coupling element to the annular tooth portion and the shaft.

\* \* \* \* \*